(12) United States Patent
Akashi

(10) Patent No.: US 7,197,157 B2
(45) Date of Patent: Mar. 27, 2007

(54) IMAGE SENSING APPARATUS AND METHOD FOR ADAPTIVELY EMBEDDING A WATERMARK INTO AN IMAGE

(75) Inventor: Akira Akashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 632 days.

(21) Appl. No.: 09/839,137

(22) Filed: Apr. 23, 2001

(65) Prior Publication Data
US 2002/0015510 A1    Feb. 7, 2002

(30) Foreign Application Priority Data
Apr. 26, 2000  (JP)  ............................. 2000-126478
Mar. 28, 2001  (JP)  ............................. 2001-0933 U

(51) Int. Cl.
*G06K 9/00*  (2006.01)

(52) U.S. Cl. ..................................... 382/100

(58) Field of Classification Search ................ 382/100, 382/232; 348/231.3, 231.5, 231.6
See application file for complete search history.

(56) References Cited

U.S. PATENT DOCUMENTS

| 5,530,759 | A | | 6/1996 | Braudaway et al. ........... 380/54 |
| 5,862,218 | A | * | 1/1999 | Steinberg ..................... 713/176 |
| 6,037,984 | A | * | 3/2000 | Isnardi et al. ........... 375/240.21 |
| 6,366,680 | B1 | * | 4/2002 | Brunk et al. ................. 382/100 |
| 6,694,040 | B2 | * | 2/2004 | Hayashi et al. ............. 382/100 |
| 2002/0080997 | A1 | * | 6/2002 | Rhoads et al. .............. 382/100 |
| 2003/0011684 | A1 | * | 1/2003 | Narayanaswami et al. ..................... 348/207.99 |

FOREIGN PATENT DOCUMENTS

| JP | 8-241403 | 9/1996 |
| JP | 10-150517 | 6/1998 |
| JP | 10-290359 | 10/1998 |

OTHER PUBLICATIONS

"Techniques for Data Hiding", W. Bender, et al., SPIE Proceedings, vol. 2420, pp. 164-173, Feb. 1995.

* cited by examiner

*Primary Examiner*—Matthew C. Bella
*Assistant Examiner*—Patrick Edwards
(74) *Attorney, Agent, or Firm*—Fitzpatrick, Cella, Harper & Scinto

(57) ABSTRACT

This invention provides a digital camera having a watermarking function that obviates the need to set various settings again upon setting of an image sensing mode and embedding mode. To this end, an image recording apparatus according to the invention, which includes an image sensing means for sensing an object and a means for embedding predetermined data in image data obtained by the image sensing, comprises a means for setting a first item for defining a mode for the image sensing, and a means for setting a second item for defining a mode for the embedding on the basis of the first item. The image sensing means senses an object on the basis of the first item. The embedding means executes the embedding on the basis of the second item. Alternatively, the apparatus is configured such that the sequence of setting of items for defining an embedding mode and image sensing mode is reversed.

2 Claims, 21 Drawing Sheets

| | | EMBEDDING FUNCTION | | TYPE | | IMAGE QUALITY(STRENGTH) BASED ON WATERMARK | | TO-BE-EMBEDDED DATA | | |
|---|---|---|---|---|---|---|---|---|---|---|
| | | ON | OFF | VISIBLE | INVISIBLE | IMAGE QUALITY PRIORITY | ROBUSTNESS PRIORITY | USER | + DATE | + CAMERA ID |
| IMAGE SENSING MODE | Auto | O | | O | | O | | O | O | O |
| | P | | | | | | | | | |
| | Tv | | | | | | | | | |
| | Av | | | | | | | | | |
| | M | | | | | | | | | |
| DRIVE | Sng | | | | | | | | | |
| | Cnt | | | | | | | | O | |
| IMAGE QUALITY (COMPRESSION) FOR STORAGE | Fine | | O | — | — | — | — | — | — | — |
| | Std | | | | | O | | | | |
| | Eco | | | | | | O | | | |
| SENSITIVITY | LOW SENSITIVITY | | | | | O | | | | |
| | HIGH SENSITIVITY | | | | | | O | | | |

| | EMBEDDING FUNCTION | | TYPE | | IMAGE QUALITY(STRENGTH) BASED ON WATERMARK | | TO-BE-EMBEDDED DATA | | |
|---|---|---|---|---|---|---|---|---|---|
| | ON | OFF | VISIBLE | INVISIBLE | IMAGE QUALITY PRIORITY | ROBUSTNESS PRIORITY | USER | +DATE | +CAMERA ID |
| IMAGE SENSING MODE — Auto | ○ | | ○ | | ○ | | ○ | ○ | ○ |
| P | | | | | | | | | |
| Tv | | | | | | | | | |
| Av | | | | | | | | | |
| M | | | | | | | | | |
| DRIVE — Sng | | | | | | | ○ | | |
| Cnt | | | | | | | | | |
| IMAGE QUALITY (COMPRESSION) FOR STORAGE — Fine | | ○ | — | — | — | — | — | — | — |
| Std | | | | | ○ | | | | |
| Eco | | | | | ○ | | | | |
| SENSITIVITY — LOW SENSITIVITY | | | | | | ○ | | | |
| HIGH SENSITIVITY | | | | | | ○ | | | |

FIG. 15

| | IMAGE SENSING MODE | | | | | | DRIVE | | IMAGE QUALITY (COMPRESSION) | | | SENSITIVITY | |
|---|---|---|---|---|---|---|---|---|---|---|---|---|---|
| | Auto | P | Tv | Av | M | Sng | Cnt | Fine | Std | Eco | LOW SENSITIVITY | HIGH SENSITIVITY |
| EMBEDDING FUNCTION — ON | | | | | | | | | | | | | |
| EMBEDDING FUNCTION — OFF | | | | | | | | | | | | | |
| TYPE — VISIBLE | | | | | | | | | | | | | |
| TYPE — INVISIBLE | | | | | | | | | | | | | |
| IMAGE QUALITY (STRENGTH) — IMAGE QUALITY PRIORITY | | | | | | | | | ○ | | | ○ | |
| IMAGE QUALITY (STRENGTH) — ROBUSTNESS PRIORITY | | | | | | | | | | | | | |
| TO-BE-EMBEDDED DATA — USER | | | | | | | | | | | | | |
| TO-BE-EMBEDDED DATA — + DATE | | | | | | | ○ | | | | | | |
| TO-BE-EMBEDDED DATA — + CAMERA ID | | | | | | | | | | | | | |

FIG. 18

| WATERMARKING | ON | UNCHANGEABLE |
| --- | --- | --- |
| VISIBLE / INVISIBLE | VISIBLE | UNCHANGEABLE |
| EMBEDDING LEVEL | HIGH IMAGE QUALITY | UNCHANGEABLE |
| USER NAME | ON | UNCHANGEABLE |
| IMAGE SENSING DATE | ON | UNCHANGEABLE |
| CAMERA ID | ON | UNCHANGEABLE |

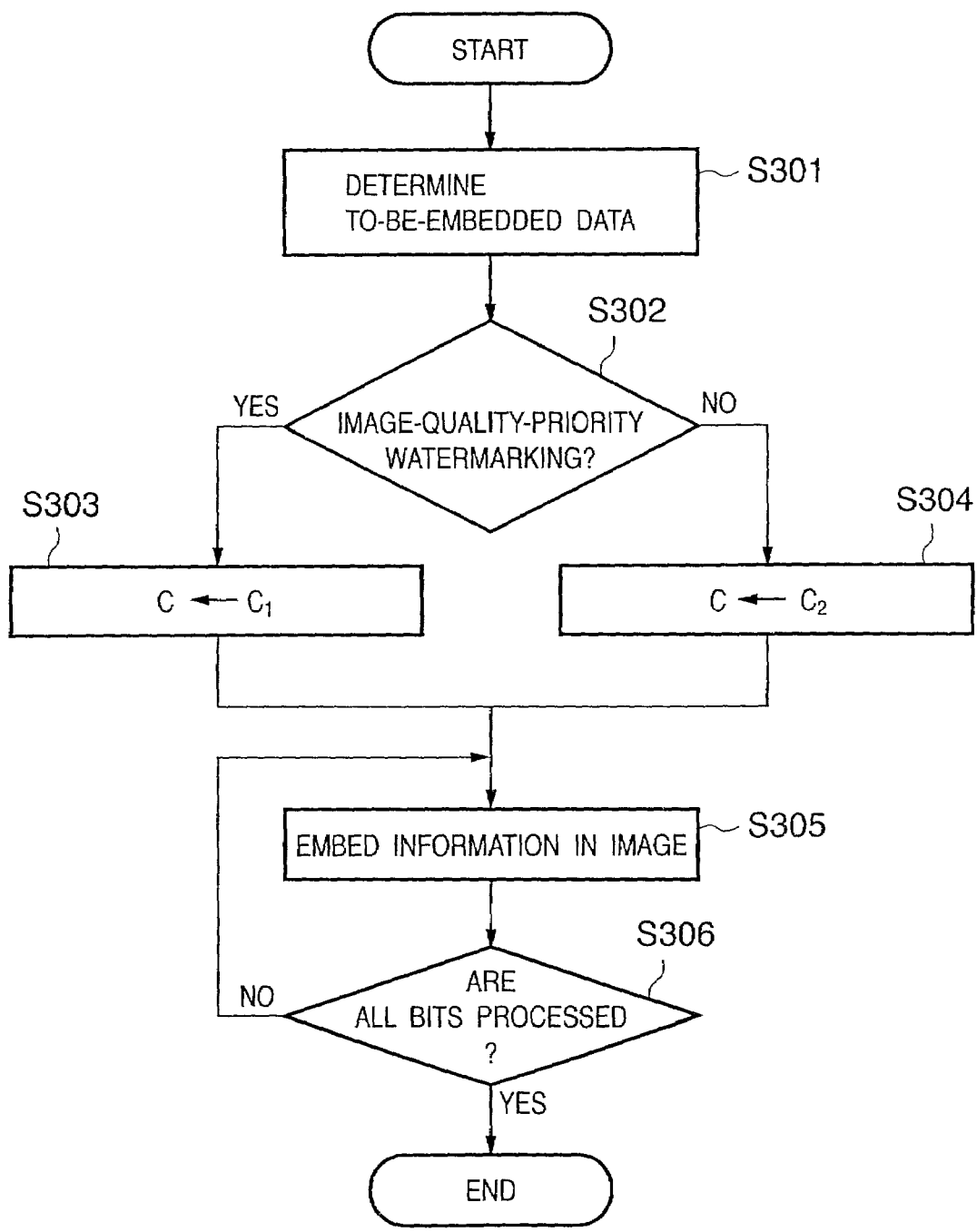

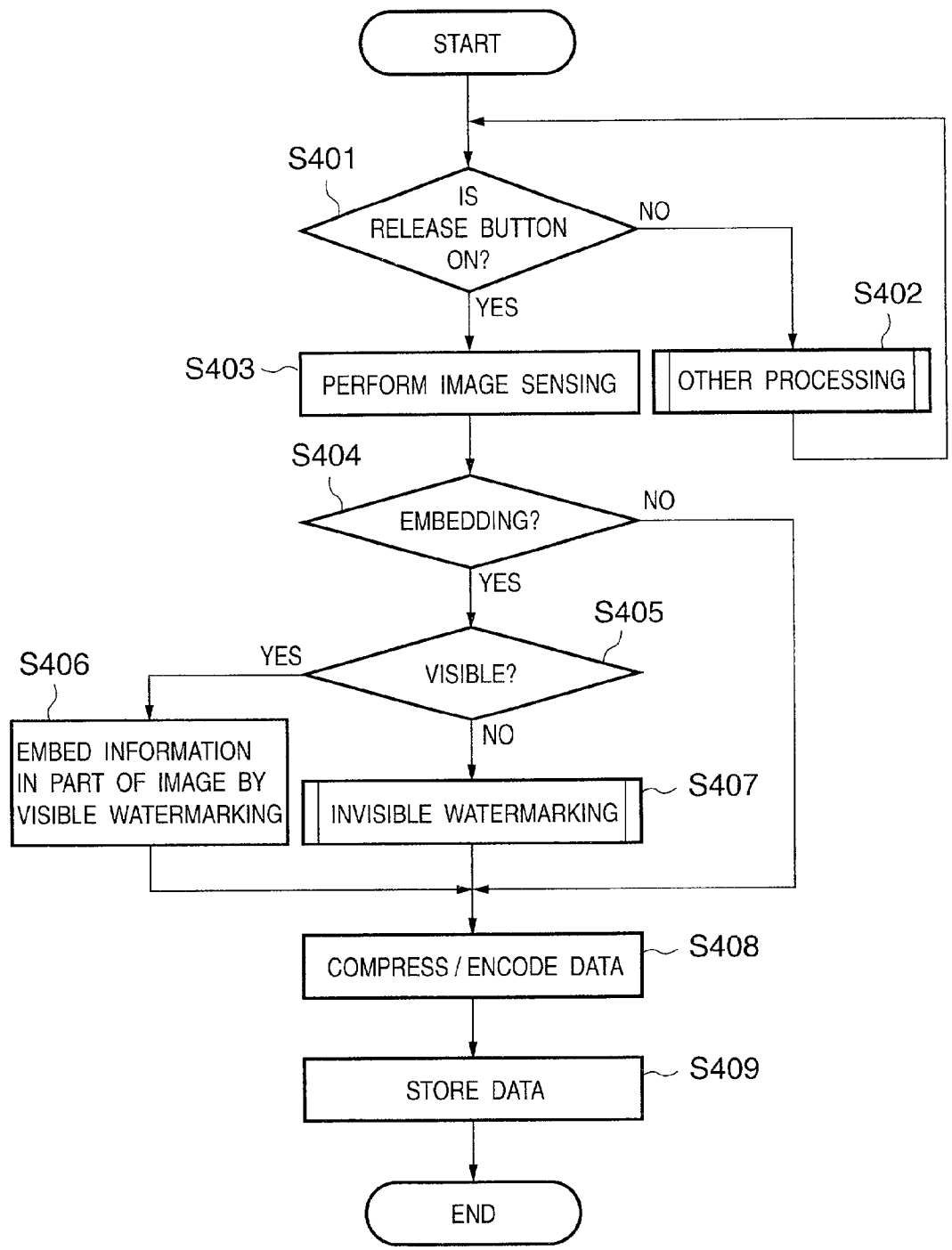

IMAGE SENSING APPARATUS AND METHOD FOR ADAPTIVELY EMBEDDING A WATERMARK INTO AN IMAGE

FIELD OF THE INVENTION

The present invention relates to an image recording apparatus for sensing and recording images and, more particularly, to an image recording apparatus capable of recording images sensed by a digital camera or the like.

BACKGROUND OF THE INVENTION

Digital still cameras, which have rapidly become popular in the recent years, are designed to electrically record images sensed by CCD sensors and the like as digital data on recording media such as memory cards, unlike conventional silver-halide cameras designed to form object images on the surfaces of films and chemically record the images as analog images.

Digital data can be easily processed by computers and easily distributed through a network and the like. The need for digital still cameras capable of easily obtaining such digital images therefore are expected to increase more and more.

On the other hand, digital data can be easily tampered, e.g., synthesized, without leaving any sign. Therefore, a problem may arise in terms of reliability when a sensed digital image is used as an evidence. Such a problem may not arise often as long as general users enjoy photography as a hobby. However, a serious problem arises when photography is required for some business or legal operation like photographs as records in a construction site.

In addition, since digital data can be easily copied/distributed, the copyright on an image cannot be satisfactorily protected.

Under the circumstances, great expectations are placed on digital still cameras capable of improving the reliability of a sensed digital image as an evidence and protecting copyright.

For such a purpose, a technique called "watermark" has been studied.

According to this technique, in digital image/audio data, another information that is not perceived by a human observer is embedded, and only a person who owns a proper qualification or right can extract the embedded information. This makes it possible to improve the reliability of an image as an evidence or protect copyright.

The principle of a watermarking technique will be described below with reference to Japanese Patent Laid-Open No. 10-290359 and FIG. 2 in a case where digital information is image information (for more detailed information, see this reference and Japanese Patent Laid-Open No. 10-150517).

FIG. 2 is a view showing the flow of a procedure for embedding information (embedded information) in image information.

First of all, an original image (digital image data 101 in FIG. 3) is divided into a plurality of blocks each (102 in FIG. 3) consisting of n pixels×m pixels (division processing). Orthogonal transformation such as discrete cosine transformation (DCT) is performed for each block to obtain n×m frequency component matrices (orthogonal transformation processing).

Before information embedding processing, an embedding position indicating a specific position in the frequency component matrices obtained by orthogonal transformation processing at which to-be-embedded information is embedded is determined by random numbers, and a change amount indicating how much the value of the corresponding frequency component is changed is determined. The embedding position and change amount are then acquired/stored as key information.

When to-be-embedded information is embedded, the information need not be embedded in all frequency component matrices in one block and may be embedded across frequency components in a plurality of blocks. In this case, a block group with proper contrast in the image is selected.

By selecting, for example, a low-frequency portion of the frequency component matrices as an embedding position, information can be embedded so as not to be perceived by a human observer. In addition, a difference from the original value of a frequency component matrix can be changed by changing the change amount. This makes it possible to control a deterioration in image quality.

To-be-embedded information is embedded (embedding processing) by changing the values of the frequency component matrices in the respective blocks on the basis of the embedding position and change amount as key information. In addition, images of a plurality of blocks each having n pixels×m pixels is obtained by performing inverse orthogonal transformation for the frequency component matrices of the respective blocks in which the to-be-embedded information is embedded (inverse orthogonal transformation processing). Finally, the images of the plurality of blocks obtained by inverse orthogonal transformation processing are connected to each other to obtain a watermark image in which to-be-embedded information is embedded (reconstruction processing).

FIG. 2 is a view showing the flow of a procedure for embedding watermark information in an image.

An watermark image is broken up into a plurality of blocks each consisting of n pixels×m pixels (segmentation processing). Orthogonal transformation such as discrete cosine transformation (DCT) is performed for each divided block to obtain n×m frequency component matrices (orthogonal transformation processing). In addition, an embedding position and change amount are obtained from the key information used in the information embedding processing, and embedded information is extracted from the frequency component matrices of the respective blocks (extraction processing).

As described above, for example, characteristic features of the watermarking technique are (1) embedded information cannot be extracted without key information used when the information is embedded, (2) embedded information in key information is generated by using random numbers, and hence is variable and difficult to decode, (3) to-be-embedded information can be embedded so as not to be perceived by a human observer by using a specific embedding position, and (4) the degree of deterioration in image quality can be controlled by changing the change amount.

The above description is about the "invisible data embedding" method of embedding data that is invisible to a human observer. In contrast to this, a "visible data embedding" method is also available, in which copyright information or the like is embedded in an original image in a perceivable state so as to dissuade the third party from fraudulently using the image.

The details of a watermarking technique for such visible data are disclosed in U.S. Pat. No. 5,530,759 (Japanese Patent Laid-Open No. 8-241403).

According to a conventional camera having a watermarking function, when the user is to change the image sensing modes (image sensing mode, drive mode, image quality mode, and sensitivity) of the camera in accordance with the image sensing purpose and object, he/she often changes the embedding mode (type mode and image quality mode) of the watermarking function and to-be-embedded information at once. In this case, in the conventional camera, these settings must be adjusted again, requiring cumbersome operation.

SUMMARY OF THE INVENTION

The present invention has been made in consideration of the above problem, and has as its object to provide an image recording method and apparatus in which when the image sensing mode is changed, the embedding mode and data are automatically set in accordance with the image sensing mode, or when the embedding mode and data are changed, the image sensing mode is automatically set in accordance with the changes.

In order to achieve the above object, the present invention has the following arrangement. There is provided an image recording apparatus including image sensing means for sensing an object and means for embedding predetermined data in image data obtained by the image sensing, characterized by comprising means for setting a first item for defining a mode for the image sensing, and means for setting a second item for defining a mode for the embedding on the basis of the first item, wherein the image sensing means senses an object on the basis of the first item, and the embedding means executes the embedding on the basis of the second item.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a view showing items to be set in the first embodiment of the present invention;

FIG. 15 is a view showing items to be set in the second embodiment of the present invention;

FIG. 18 is a view showing the principle of information embedding by watermarking;

FIG. 20 is a flow chart showing a procedure for invisible watermarking; and

FIG. 21 is a flow chart showing a procedure for showing overall processing in the embodiment.

DETAILED DESCRIPTION OF THE PREFERRED EMBODIMENTS

Embodiments of the present invention will be described in detail below with reference to the accompanying drawings.

[First Embodiment]

Figure 4:
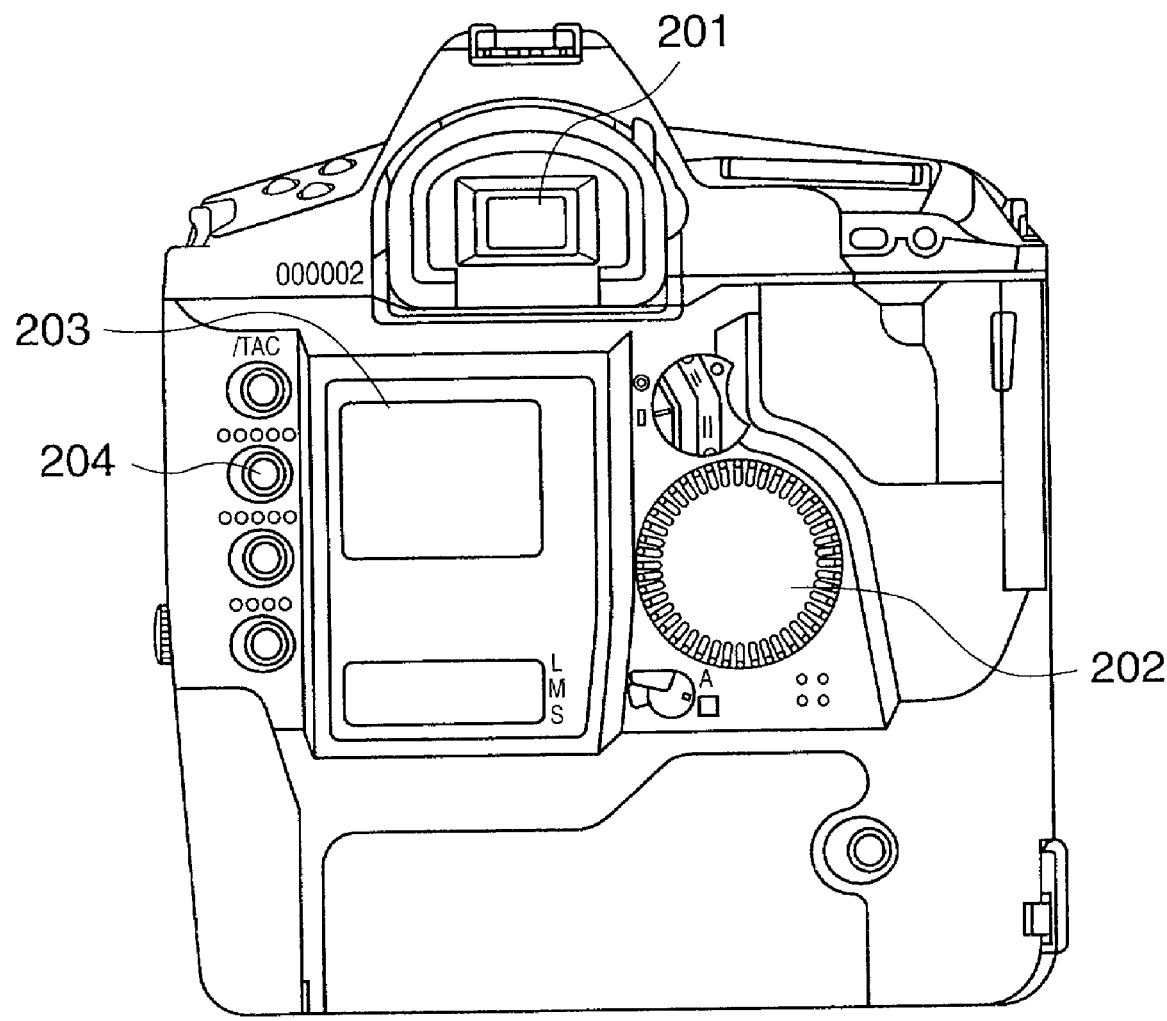
FIG. 4 is a rear view of a digital still camera.

FIG. 4 is a rear view of a digital still camera according to an embodiment of the present invention.

The digital still camera according to this embodiment has an optical finder 201. A rear electronic dial 202 for inputting an up-down signal, a color monitor 203 formed by an LCD for displaying sensed images and user interface windows, various setting buttons 204, and the like are arranged on the rear surface portion of the camera.

With regard to various settings for a watermark, the user can input/change the corresponding information by using the setting buttons 204 and rear electronic dial 202 while watching the menu window displayed on the color monitor 203.

Figure 5A:
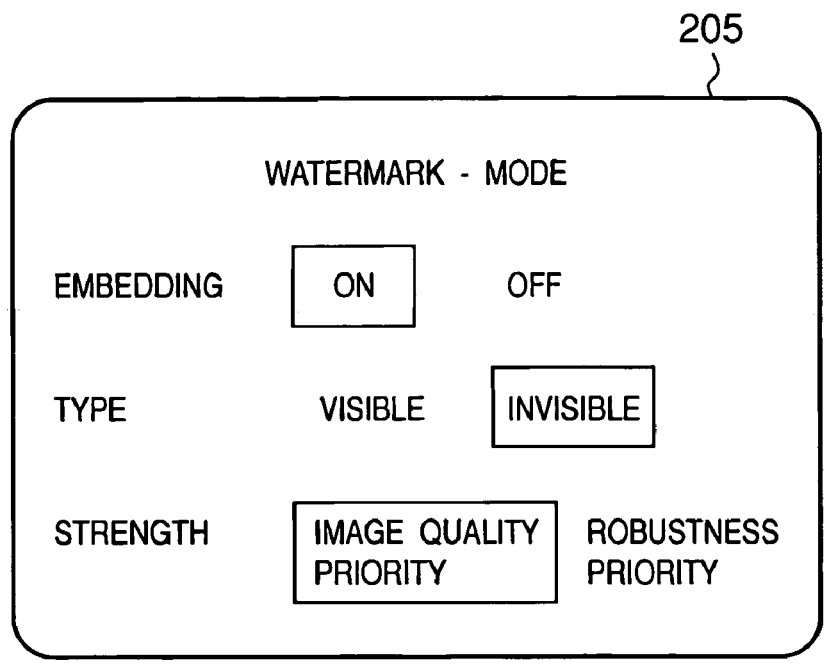
FIGS. 5A and 5B are views showing display samples on the rear monitor of the digital still camera.

FIG. 5A shows a display sample 205 of color monitor screen 203 on which the watermark embedding mode is set. Referring to FIG. 5A, the respective items are currently set to the contents enclosed in the boxes. According to this setting example, the "embedding" function is "ON", the "type" of embedding is "invisible" embedding, and the embedding "strength" is "image quality priority".

The embedding strength corresponds to the change amount described above. When higher priority is to be given to image quality, the change amount is reduced to decrease the embedding strength to avoid a deterioration in image quality. In contrast to this, when higher priority is to be given to robustness, the embedding strength is increased by increasing the change amount. However, this causes a deterioration in image quality. Image quality is in a trade-off relationship with robustness.

In this embodiment, when visible watermark information is to be embedded, the information is embedded in part of a corner of image data obtained by image sensing operation. That is, such information is not embedded in a central portion of the image at which the embedded information interferes with the object image. Visible watermark embedding processing itself is performed by a known technique.

When information is to be embedded by invisible watermark processing, the information is embedded in the entire image data obtained by image sensing operation. Although invisible watermark embedding processing itself is performed by a known technique, this embedding is configured to allow the user to choose between increasing watermark robustness (robustness-priority watermarking) with a slight deterioration in image quality or minimizing a deterioration in image quality (image-quality-priority watermarking) with a slight decrease in robustness. This operation will be described in detail later.

Figure 5B:
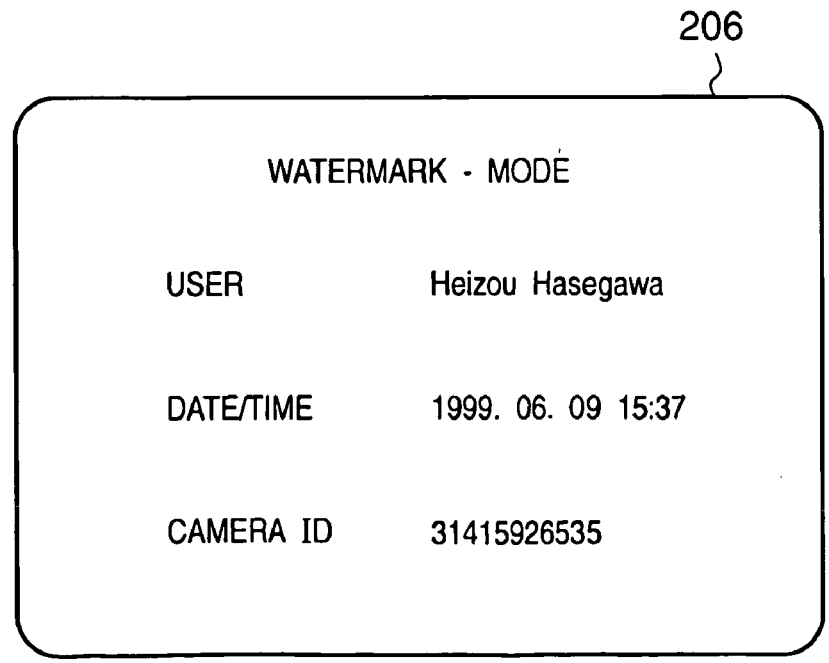

By operating setting buttons, the display sample on the color monitor 203 is switched to a display sample 206 for setting to-be-embedded data like that shown in FIG. 5B.

In this embodiment, "Heizou Hasegawa" is set as "user" data; "1999.06.09 15:37", as "date/time" data; and "31415926535", as "camera ID" data, and these data are embedded in sensed image data in watermark embedding processing.

The date/time data is information that is held by a conventional camera, so necessary data may be referred to from the date/time function.

The camera ID data is a value set in the assembly process in the factory. This data is unique to the type of camera or maker and cannot be changed.

The user therefore can change only the "user" data. Obviously, information that can be arbitrarily added may be added to the above information. Note that when the user inputs his/her name, he/she shifts the current mode to the user name input mode to input letters one by one by operating the dial 202. The input user name is stored in a flash memory 306.

Figure 6:
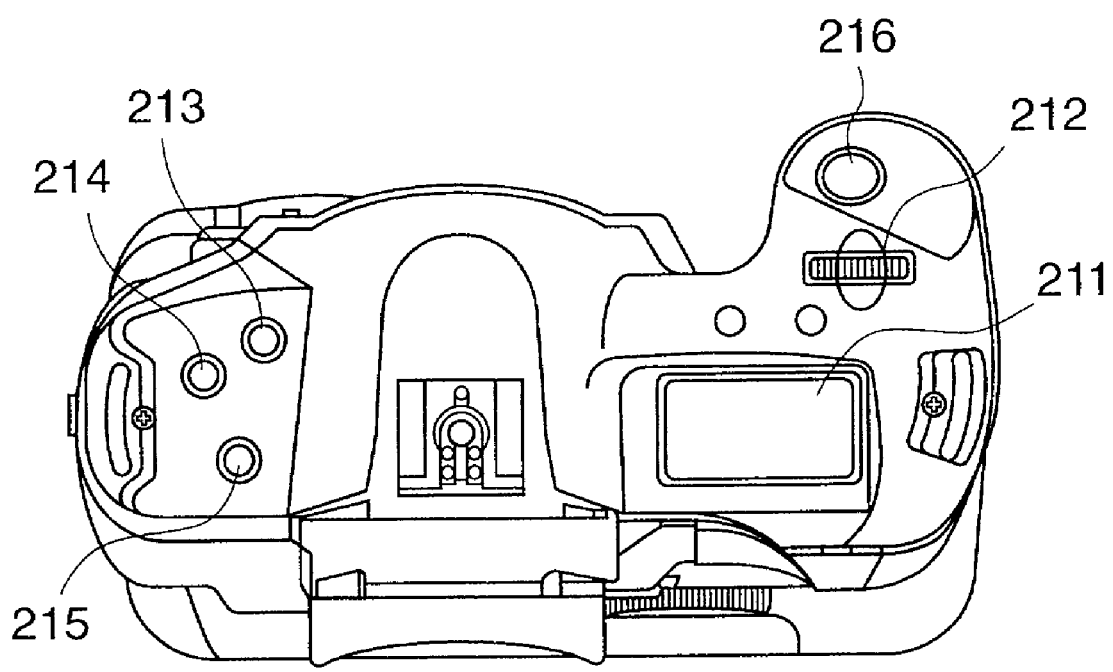
FIG. 6 is a top view of the digital still camera.

FIG. 6 is a top view of the digital still camera according to this embodiment. The digital still camera according to this embodiment includes an image sensing information display liquid crystal unit 211, an upper electronic dial 212 for inputting an up-down signal, various setting buttons 213 to 215 for setting image sensing operations for the camera, a release button 216, and the like.

Figure 7:
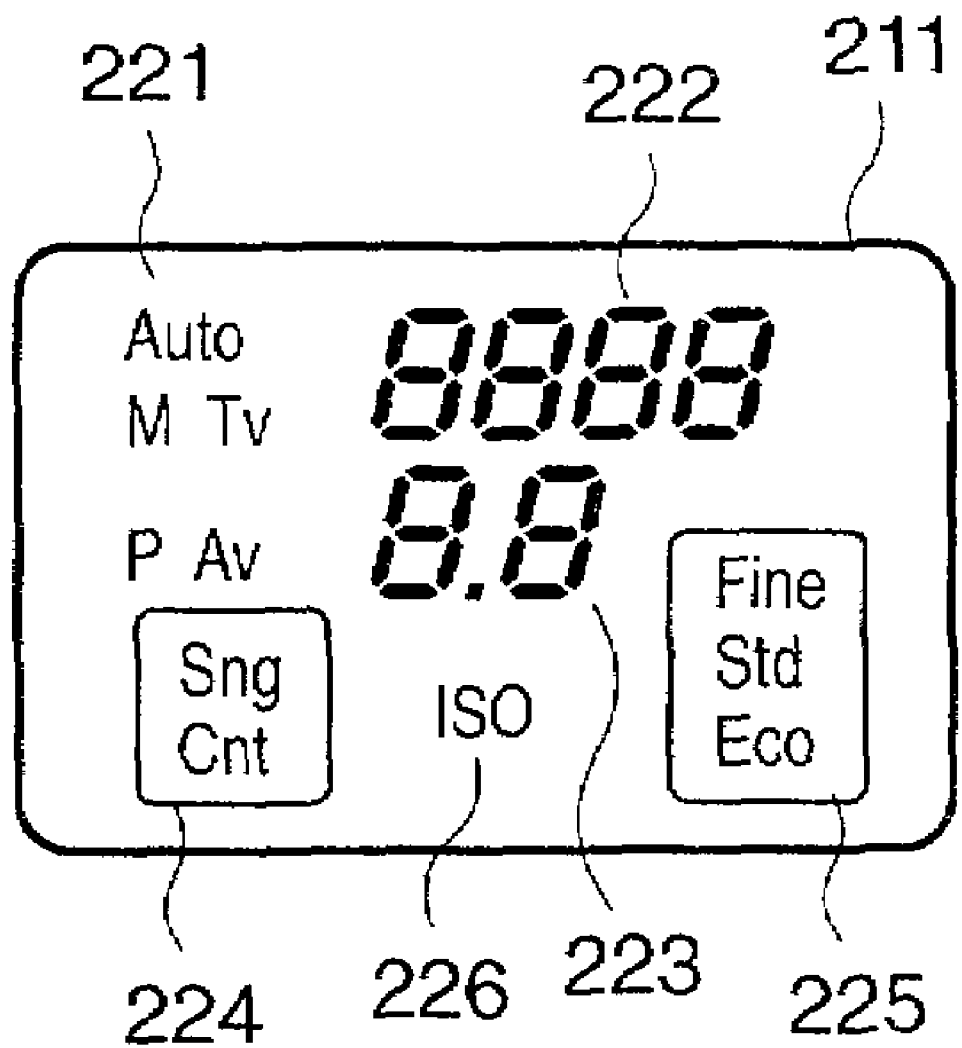
FIG. 7 is a view showing an example of the image sensing information display liquid crystal unit of the digital still camera.

FIG. 7 shows an example of the contents displayed on the image sensing information display liquid crystal unit 211. Reference numeral 221 denotes a segment for displaying various image sensing modes, which include "Auto" mode of automatically determining all camera functions, "P" mode of automatically determining a shutter speed and an F-number on the basis of photometric data, "Tv" mode of automatically determining an F-number (or aperture value) when the user manually sets a shutter speed, "Av" mode of automatically determining a shutter speed when the user manually sets an F-number, and "M" mode of manually setting both a shutter speed and an F-number. Only the letter or letters indicating one image sensing mode selected by the user is illuminated on the image sensing information display liquid crystal unit 211.

Four seven-segment displays 222 display a shutter speed. Two seven-segment displays 223 arranged on two sides of a dot display an F-number.

Reference numeral 224 denotes a drive mode display, on which "Sng" indicates the single-exposure mode of image sensing one frame when the release button 216 is pressed, and "Cnt" indicates the continuous-exposure mode of continuously image sensing frames while the release button is pressed. One of the character sets is displayed.

Reference numeral 225 denotes an image quality display for digital images. In this mode, the user selects an image quality for an image when it is stored in a memory card, i.e., a degree of JPEG compression is selected. "Fine" indicates a high-image-quality (low compression) mode; "Std", a standard-image-quality (intermediate compression) mode; and "Eco", a low-image-quality (high compression) mode.

Reference numeral 226 denotes a display for setting a sensitivity for the digital camera, which is used with the seven-segment displays 222 to display a film speed converted into the ISO number of a photographic film. This value depends on the sensitivity of the digital camera. Setting this value amounts to adjusting the output gain of the image sensing sensor to sense an image at a shutter speed and F-number equivalent to those of a conventional camera loaded with a silver-halide film with the set value with respect to the same object. If, for example, "ISO 800" is set, the gain of the image sensing sensor is adjusted to a relatively high sensitivity in accordance with the set value. In this case, however, since the S/N ratio decreases, the image quality will deteriorate. If a low sensitivity like "ISO 100" is set, the gain of the image sensing sensor is set to a low value, and the image quality improves.

Figure 8:
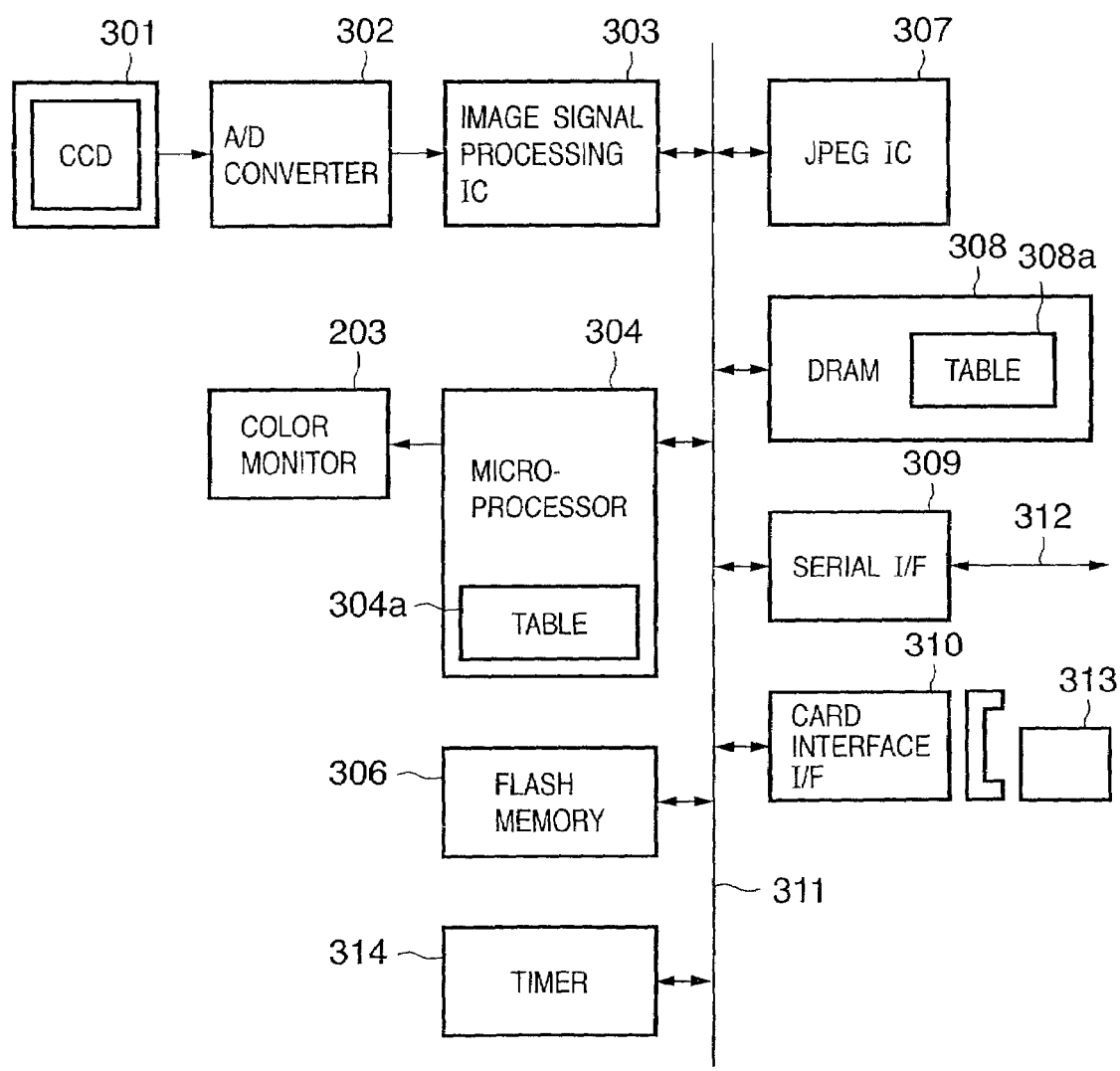
FIG. 8 is a block diagram showing the electrical arrangement of the digital still camera.

FIG. 8 is a block diagram of the digital still camera according to this embodiment of the present invention.

A microprocessor 304 in the camera controls various devices in accordance with the programs stored in the flash memory 306 in advance.

The microprocessor 304 incorporates a ROM 304a storing programs corresponding to flow charts to be described later and the table shown in FIG. 14 which will be described in detail later.

When releasing operation is performed, an object image is formed on an image sensing sensor 301 (e.g., a CCD area sensor), and the image signal is A/D-converted by an A/D converter 302. The resultant signal is subjected to color interpolation and filtering in an image signal processing IC 303. The resultant data is temporarily stored in a DRAM 308 via a data bus 311. A timer 314 is also connected to data bus 311.

Note that a watermark table 308a in which current state information about watermarking is stored is ensured in the DRAM 308 (this operation will be described in detail later).

Digital image data stored in the DRAM 308 is displayed on the color monitor 203 as needed.

Data such as copyright information is embedded in the digital image data by a method according to the present invention which will be described later. This data is compressed by a JPEG IC 307. The compressed data is then written in a detachable memory card 313 via a card interface (I/F) 310.

The image data can also be output to a serial bus 312 via a serial I/F 309, and hence can easily be distributed via a network.

Figure 1:
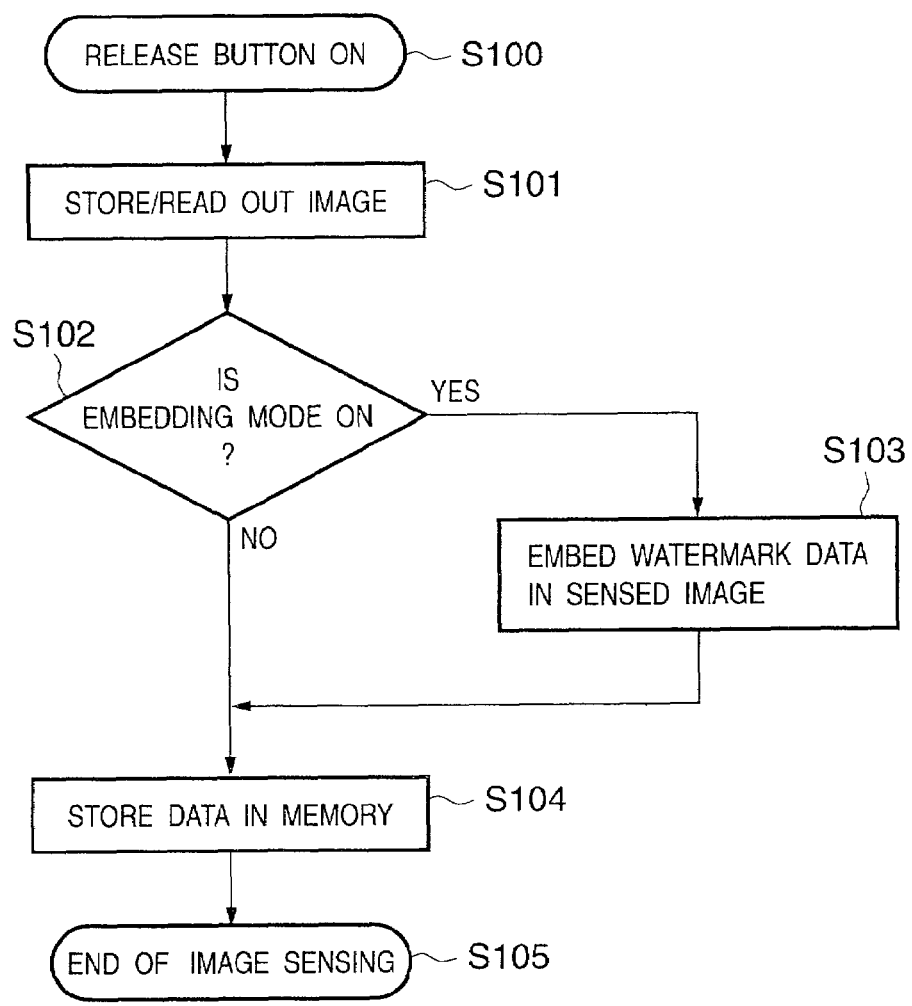
FIG. 1 is a flow chart showing the flow of processing performed in a camera according to the first embodiment of the present invention.
Figure 2:
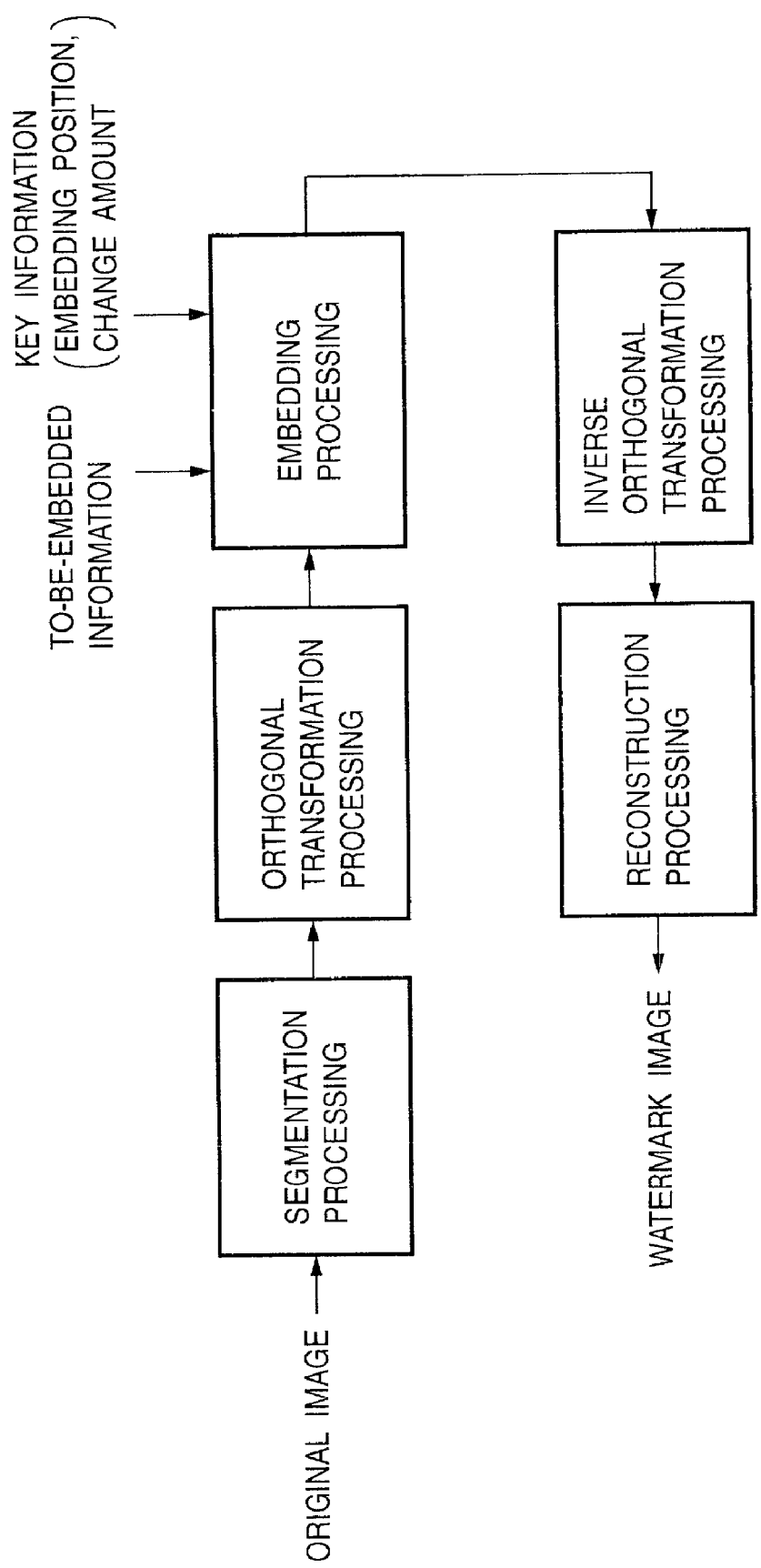
FIG. 2 is a view showing processing associated with a watermarking technique.
Figure 3:
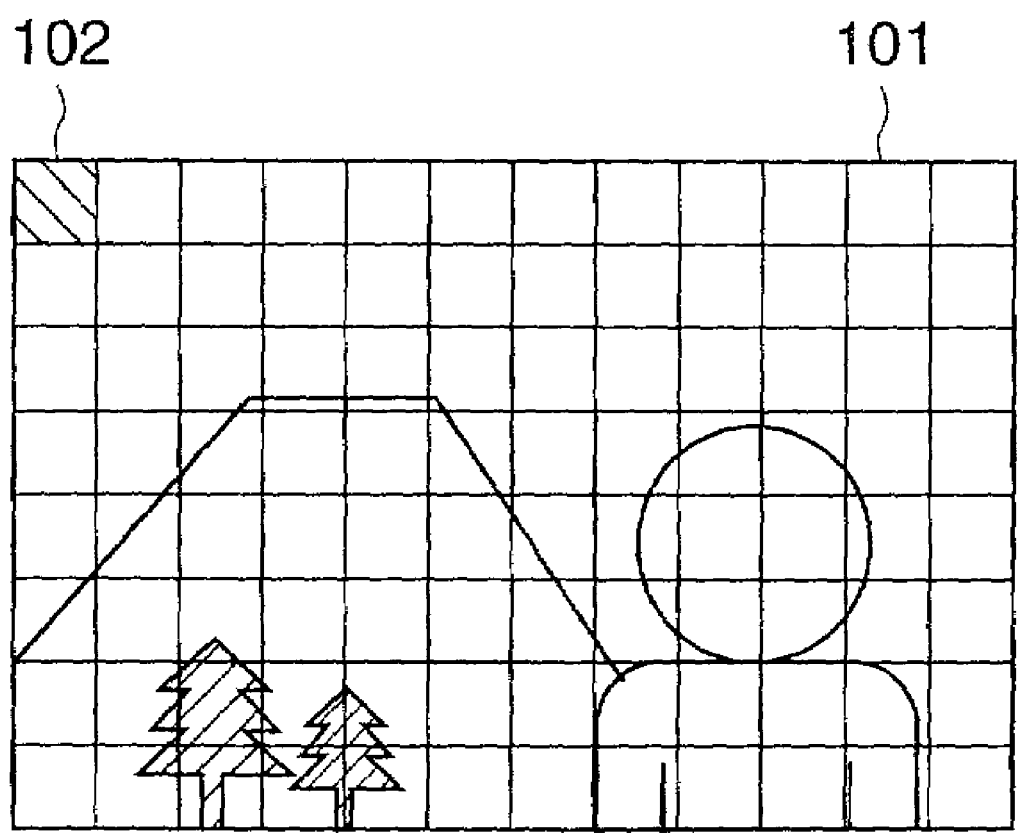
FIG. 3 is a view showing block division of image data.

FIG. 1 is a flow chart showing the flow of processing in the digital camera according to this embodiment of the present invention.

In the flow chart of FIG. 1, when the release button 216 of the camera is pressed, the flow advances from step S100 to step S101 to drive the image sensing sensor to perform "integration/read out" (this step includes image signal processing and storage of data in the DRAM).

In step S102, it is checked whether the embedding function is on. If the setting is "ON", the flow advances to step S103. If the setting is "OFF", the flow advances to step S104.

In step S103, to-be-embedded data set in advance (the user name, time, and camera ID in this embodiment) are embedded in the image data. After the processing in step S103, the flow advances to step S104.

In step S104, the digital image data having undergone the processing in step S102 or S103 is stored in the flash memory, and the image sensing operation is terminated in step S105. Although not specifically described, JPEG compression is executed before the data is stored in the memory.

FIG. 14 shows the relationship between the image sensing modes of the camera according to the first embodiment and the corresponding watermark modes. The watermark modes that are automatically set when a given image sensing mode is set are indicated by "○".

The contents shown in FIG. 14 will be described with reference to FIG. 9 and the subsequent drawings.

Figure 9A:
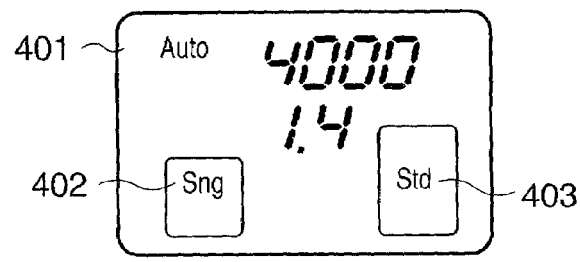
FIGS. 9A to 9C are views showing monitor display samples and an example of the image sensing information display liquid crystal unit according to the first embodiment of the present invention.

When the image sensing mode of the camera is set to "Auto" mode by using the image sensing mode setting button 213 and upper electronic dial 212 in FIG. 6, the contents shown in FIG. 9A are displayed on the photographing information display liquid crystal unit 211.

When "Auto" mode 401 is set, settings are made in modes other than the image sensing mode; the drive mode is set to "Sng (single)" 402, and the image quality mode is set to "Std (Standard)" 403.

Figure 9B:
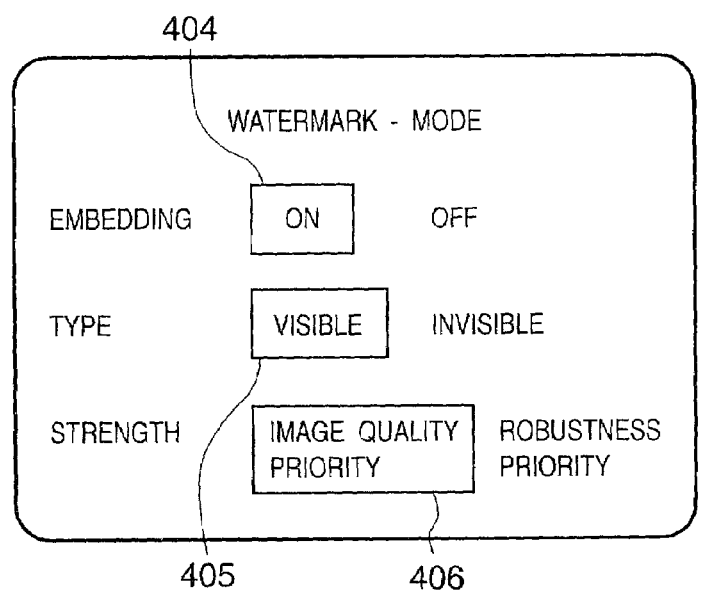
Figure 9C:
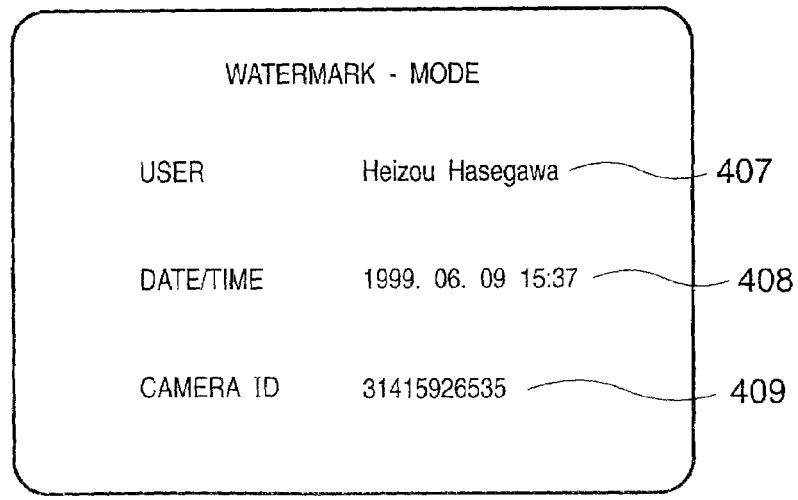

With this operation, the watermark mode is automatically changed as shown in FIGS. 9B and 9C. The embedding mode is set to "ON" 404; the type, "Visible" 405; and the strength, "image quality priority" 406. As to-be-embedded data, "user" 407, "date/time" 408, and "camera ID" 409 are set and embedded in the image data. Note that when "Auto" mode is set, the contents shown in FIG. 9B cannot be changed. The reason for this will be described later.

Figure 10A:
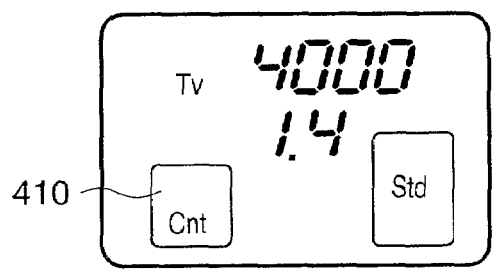
FIGS. 10A to 10C are views showing monitor display samples and an example of the image sensing information display liquid crystal unit according to the first embodiment of the present invention.
Figure 10B:
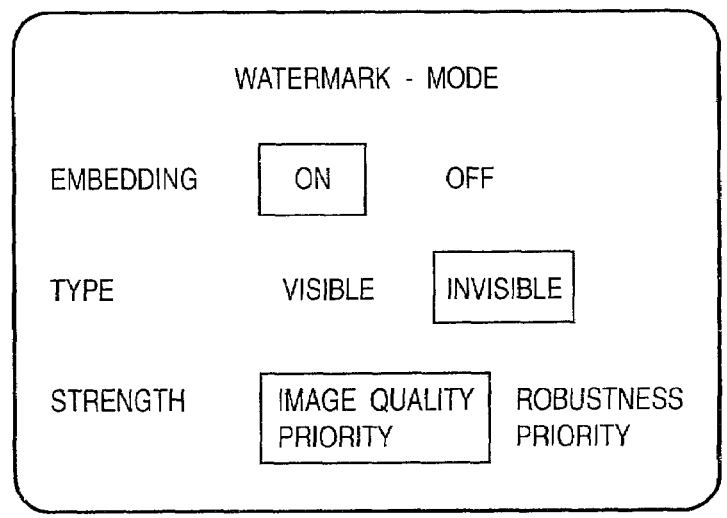
Figure 10C:
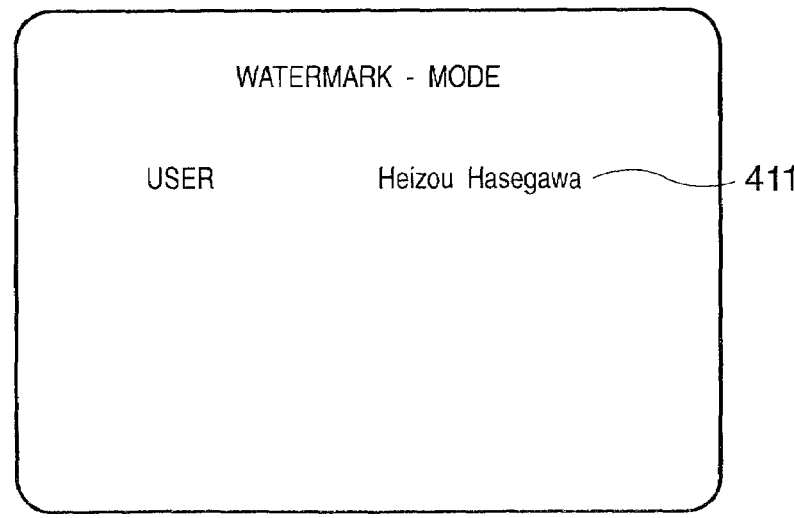

When the user sets the image sensing mode and drive mode to "Tv" mode and "Cnt (Continuous)" 410 as shown in FIG. 10A, the contents of to-be-embedded data are changed to only "user" data 411 shown in FIG. 10C in accordance with the setting of this drive mode "Cnt (Continuous)".

If the number of to-be-embedded data is large, it takes time to perform embedding processing. The above setting is therefore made to shorten the processing time by limiting the to-be-embedded data to only user data in the continuous-exposure mode, thereby preventing a decrease in the frame speed of the continuous-exposure mode.

Note that "○" in FIG. 14 indicates a fixed setting. If, for example, the user selects "Auto" as an image sensing mode, "embedding" is ON. An image-quality-priority visible watermarking method is set as an embedding method, and "user+image sensing date+camera ID" is embedded as to-be-embedded data. These settings cannot be changed. Note that if the user selects "Auto", "Std" is set as image quality for storage.

Note that "-" indicates no setting can be selected. If, for example, "Fine" is selected (an image sensing mode other than "Auto" can be selected), "embedding" is OFF. Since the user can neither choose between visible watermarking and invisible watermarking nor select an image quality based on watermarking and the type of data to be embedded, these items are indicated by "-" as shown in FIG. 14.

The user can arbitrarily select settings in the remaining items with no symbols. If, for example, the user selects the manual mode "M" as an image sensing mode, he/she can arbitrarily choose to embed data or not and can arbitrarily choose between the image-quality-priority mode and the robustness-priority mode when data is to be embedded. Even if, however, the user selects the manual mode "M", watermarking cannot be performed when the storage form is set to "Fine". If "embedding" is set to OFF, the user cannot select data such as the type of data to be embedded.

As described above, the image sensing modes of the camera of this embodiment include the five types of modes, i.e., "Auto", "P", "Tv", "Av", and "M". The user can select one of them by operating the upper electronic dial 212. When one image sensing mode is selected, information about watermarking in the corresponding image sensing mode is read out from the table 304a (see FIG. 14) and stored in the watermark table 308a in the DRAM 308. If, for example, "Auto" mode is selected, the data shown in FIG. 18 are stored in the watermark table 308a. As shown in FIG. 18, "embedding" is set to ON, visible watermarking is performed (visible watermark information is embedded in a corner of an image), and image data is stored as high-image-quality data. In addition, the user name, image sensing date, and camera ID are all stored as to-be-embedded data. In "Auto" mode, flags indicating that these parameters associated with watermarking cannot be changed are set, and hence the user cannot change them. When the parameters are to be changed, the user must select another image sensing mode and update the watermark table 308a.

Figure 11A:
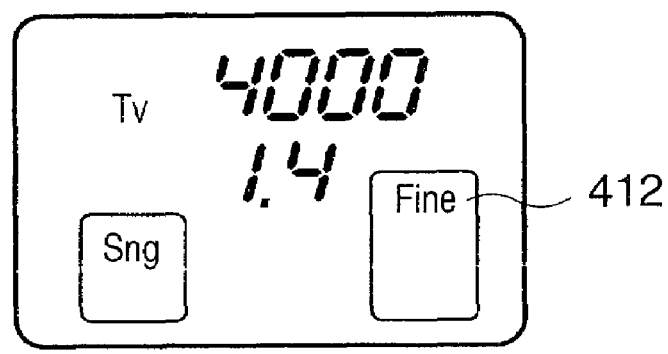
FIGS. 11A and 11B are views showing monitor display samples and an example of the image sensing information display liquid crystal unit according to the first embodiment of the present invention.
Figure 11B:
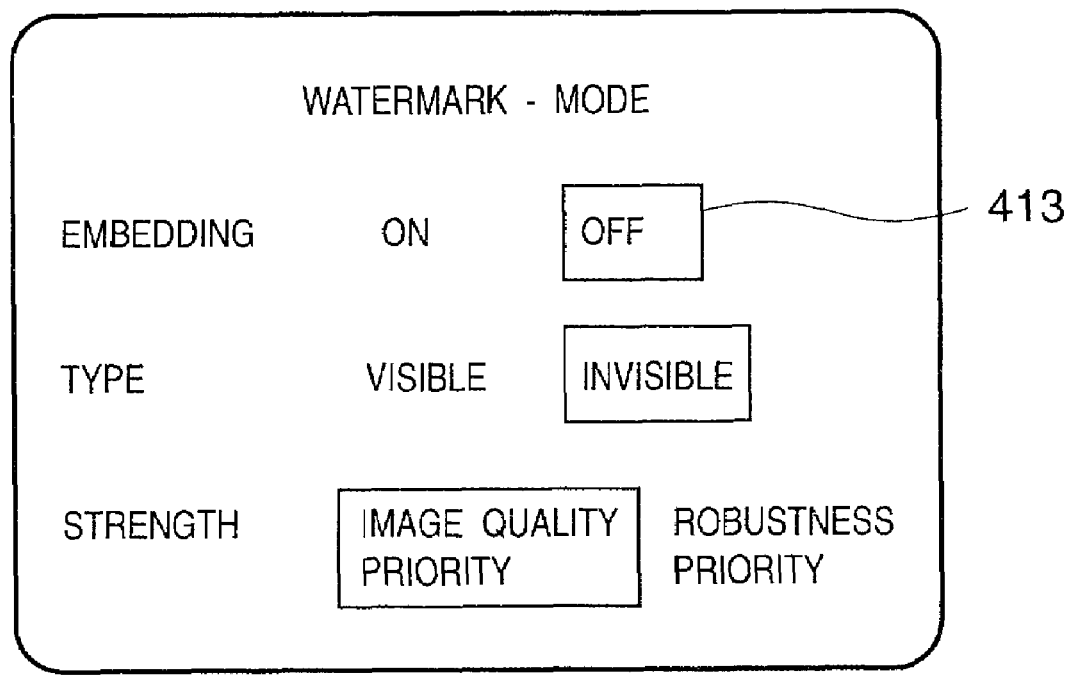

When the user sets the image quality (JPEG compression) mode to "Fine (high image quality)" mode 412, as shown in FIG. 11A, the embedding mode is turned off (413 in FIG. 11B).

The watermarking technique is a procedure for embedding information by changing image data itself, and hence may affect the image quality more or less. For this reason, when the user sets the image quality mode to "Fine (high image quality)" mode, the watermarking function is turned off.

Figure 12A:
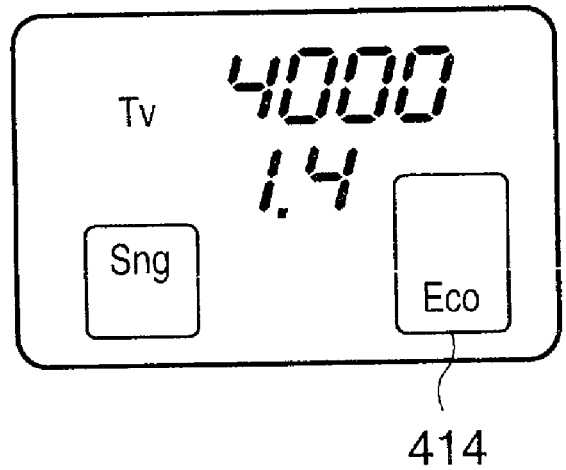
FIGS. 12A and 12B are views showing monitor display samples and an example of the image sensing information display liquid crystal unit according to the first embodiment of the present invention.
Figure 12B:
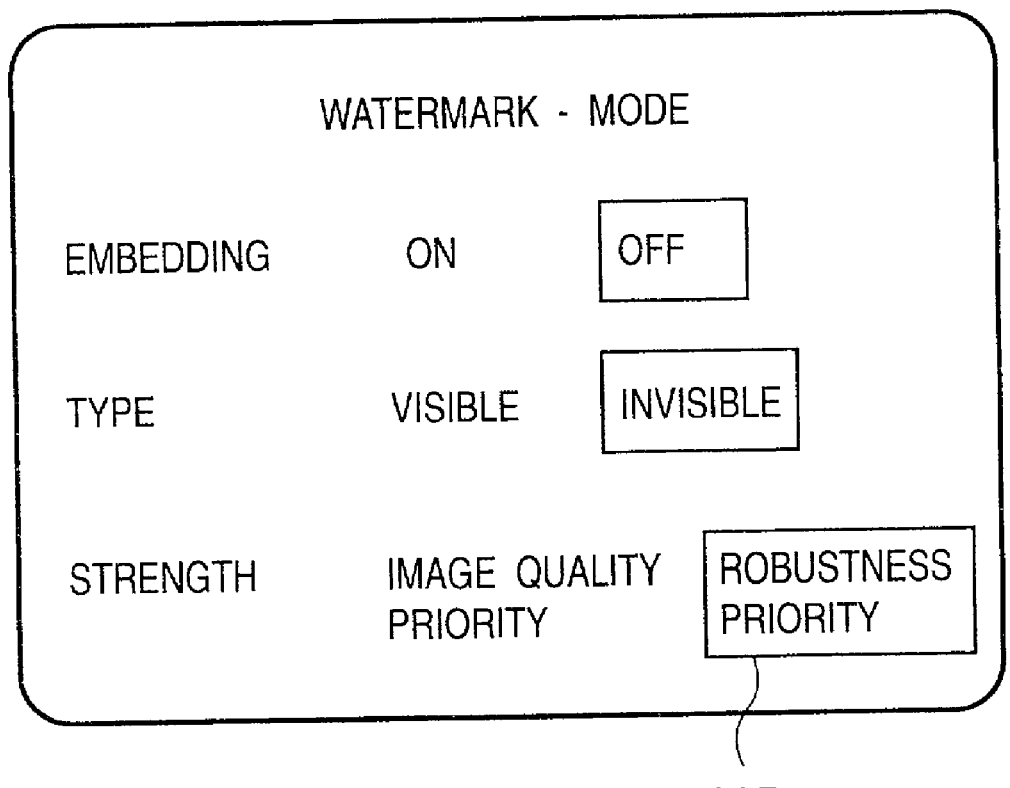

Likewise, when the user sets the image quality (JPEG compression) mode to "Eco (low image quality)" mode 414, as shown in FIG. 12A, "strength" in the watermark mode is changed to "robustness priority" (415 in FIG. 12B).

When the user sets the image quality mode to "Eco (low image quality)" mode, since high priority is not given to image quality, the embedding "strength" of watermark information may be set to "robustness priority" rather than "image quality priority".

Figure 13A:
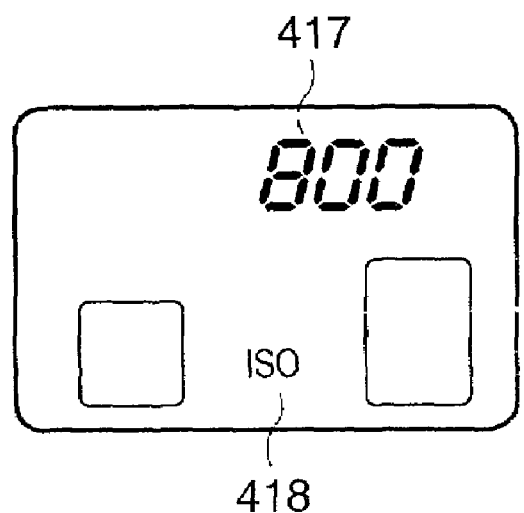
FIGS. 13A and 13B are views showing monitor display samples and an example of the image sensing information display liquid crystal unit according to the first embodiment of the present invention.
Figure 13B:
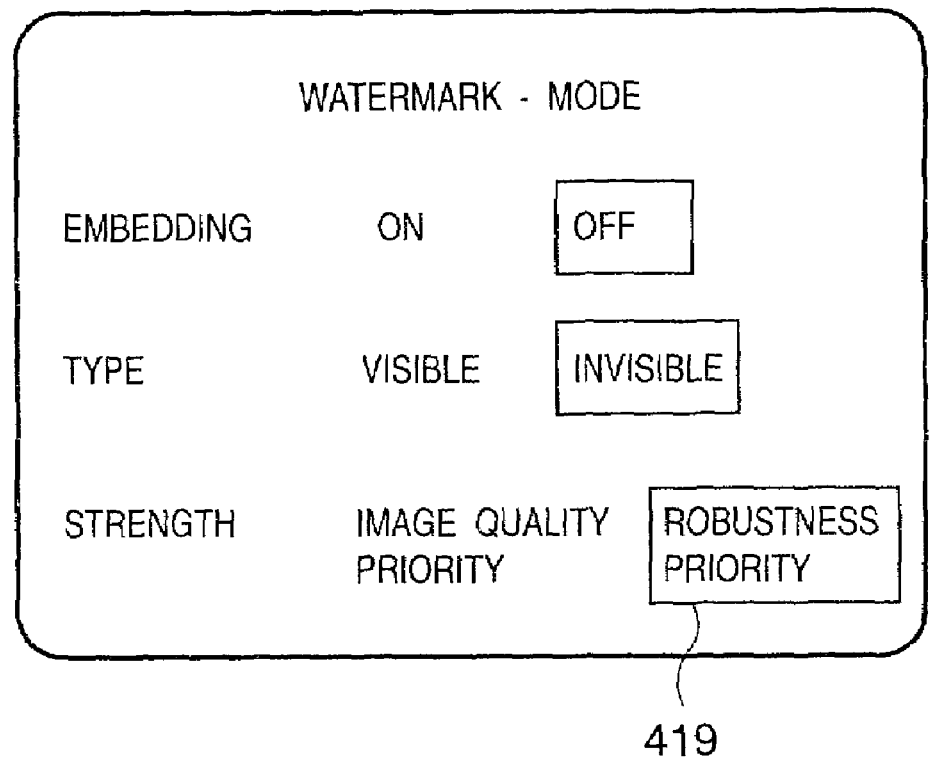

When the user sets "800" (417) equivalent to ISO 800 (418) of a photographic film, as shown in FIG. 13A, since this indicates a case where the sensitivity is to be increased with respect to a dark object, the S/N ratio of image data greatly decreases. In such setting, therefore, "strength" in the watermark mode may be changed to "robustness priority" (419 in FIG. 13B).

Watermarking used in this embodiment will be described next. Robustness-priority watermarking and image-quality-priority watermarking will be described afterward.

This embodiment uses the principle of a method called the Patchwork method to embed additional information (the user name, image sensing date, and camera ID in this embodiment). The Patchwork method is disclosed in, for example, Walter Bender, Daniel Gruhl, Norishige Morimoto, and Anthony Lu, "Techniques for data hiding (First Volume)", NIKKEI ELECTRONICS, 1997.2.24. The principle of the Patchwork method will be described first.

Figure 16:
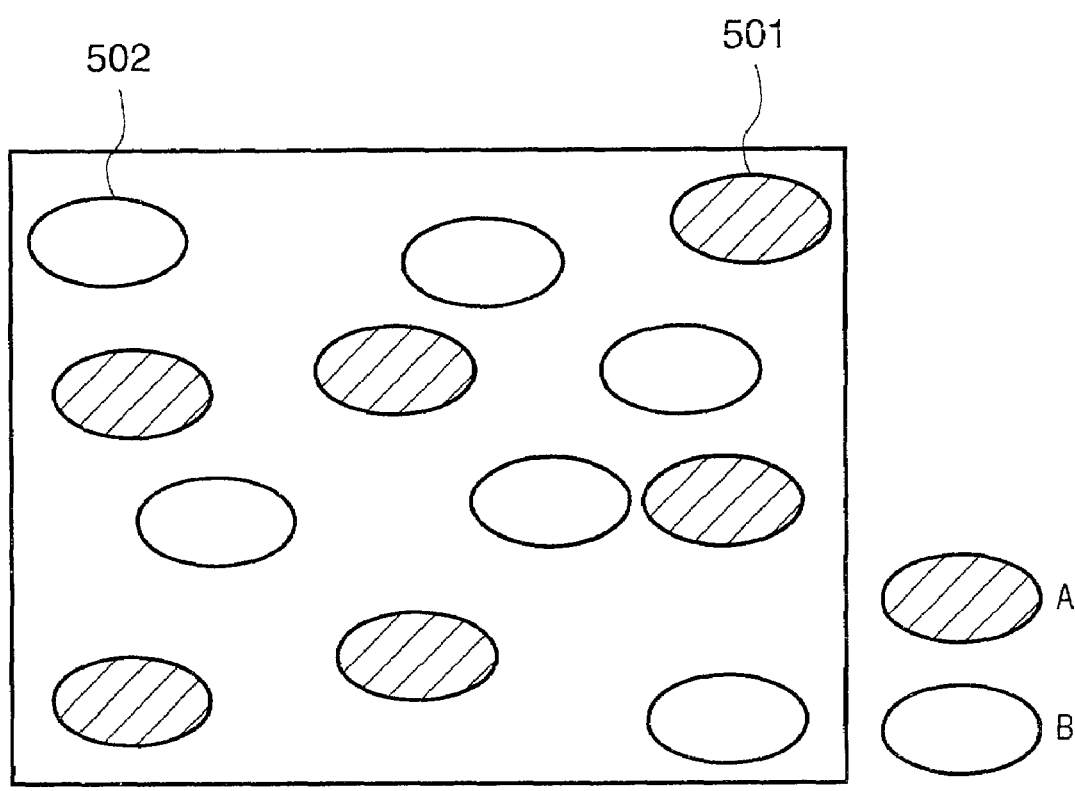
FIG. 16 is a view showing the principle of information embedding by watermarking.

The principle of the Patchwork method will be described with reference to FIG. 16. Referring to FIG. 16, two subsets A and B are set in an image. Assume that the subset A consists of a plurality of subset elements represented by a subset $a_i$ 501, and the subset B consists of a plurality of subset elements represented by a subset $b_i$ 502.

If these two types of subset elements do not overlap each other, additional information can be embedded by the Patchwork method in this embodiment.

Assume that the subsets A and B are sets each consisting of N elements represented by $A=\{a_1, a_2, \ldots, a_N\}$ or $B=\{b_1, b_2, \ldots, b_N\}$. Assume also that each of elements $a_i$ and $b_i$ of the subsets A and B represents a pixel having a pixel value or a pixel set.

In this case, an index d is defined as:

$$d = 1/N \cdot \Sigma(a_1 - b_i)$$

where $\Sigma$ is the sum of i=1 to N.

This index indicates the expectation of the difference between the pixel values of two sets.

Assume that proper subsets A and B are selected for a general natural image, and the index d is defined. In this case, if N is a sufficiently large value, then the index d tends to become $$d \approx 0$$

Figure 17:
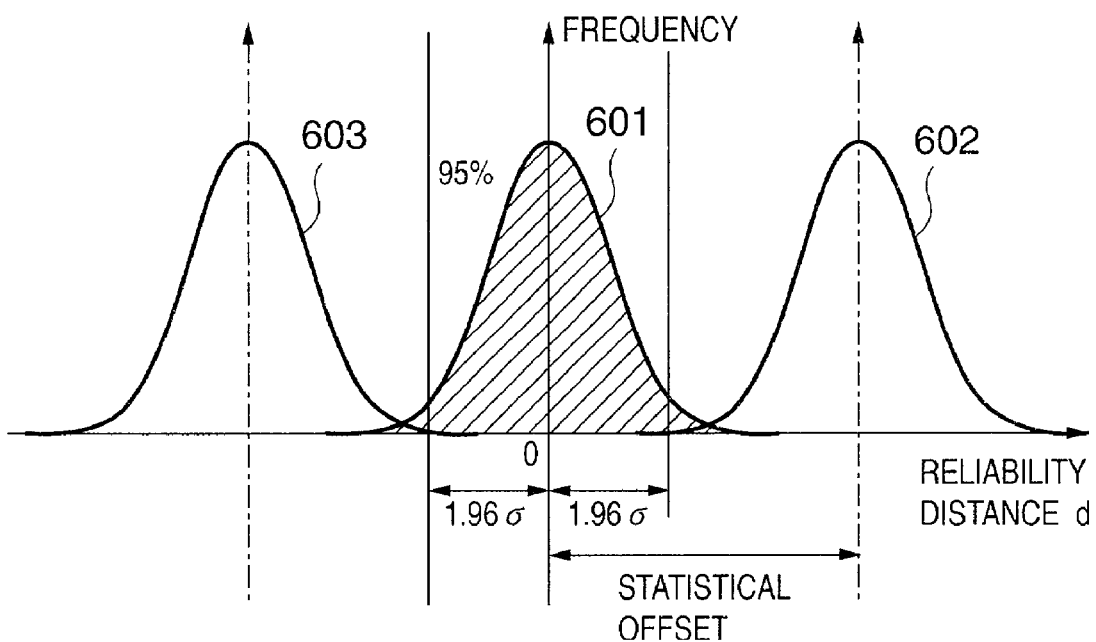
FIG. 17 is a view showing the principle of information embedding by watermarking.

The index d therefore exhibits a distribution like a distribution 601 in FIG. 17. This value d will be referred to as a reliability distance hereinafter.

If, for example, bit information "1" is to be embedded as each bit of additional information, the following operation (addition/subtraction) is performed:

$$a'_i = a_i + c$$

$$b'_i = b_i - c$$

In this operation, "c" is added to the pixel value of every element of the subset A, and "c" is subtracted from the pixel value of every element of the subset B. In this embodiment, this value "c" will be referred to as "embedding depth" hereinafter.

In this case, as in the above case, the subsets A and B are selected from the image in which additional information is embedded, and the index d is calculated to obtain (each $\Sigma$ is the sum total of i=1 to N):

$$d = 1/N \cdot \sum (a_i - b_i)$$
$$= 1/N \cdot \sum \{(a_i + c) - (b_i - c)\}$$
$$= 1/N \cdot \sum \{(a_i - b_i) + 2c\}$$
$$= 2c$$

That is, d takes a value separated from 0 by a predetermined distance (=2c), and exhibits a distribution 602 in FIG. 17.

When bit information (bit information "0") is to be embedded, the following operation is performed:

$$a'_i = a_i - c$$
$$b'_i = b_i + c$$

Then, the reliability distance d becomes:

$$d = 1/N \cdot \sum (a_i - b_i)$$

-continued
$$= 1/N \cdot \sum \{(a_i + c) - (b_i + c)\}$$
$$= 1/N \cdot \sum \{(a_i - b_i) - 2c\}$$
$$\approx -2c$$

As a consequence, d takes a value separated from 0 by a predetermined distance (=−2c) in the negative direction, as indicated by reference numeral 603 in FIG. 17.

That is, for a given image, whether additional information is embedded can be determined by calculating the reliability distance d for the image.

If reliability distance d≈0, no additional information is embedded. If the reliability distance d is a positive value separated from 0 by a predetermined amount (threshold) or more, it can be determined that bit information "1" is embedded. If the reliability distance d is a negative value separated from 0 by a predetermined amount, it can be determined that bit information "0" is embedded.

In this embodiment, since the user name, image sensing date, and camera ID are to be embedded, a plurality of bits must be embedded.

If, for example, a total of Q bits are to be embedded, the image may be divided into M areas (M≧Q), and the bits may be embedded in the respective areas. Each of the areas obtained by dividing the image is defined as a pixel block, each pixel block contains N pixels (N is an even number, for example), and the respective pixels are defined as $X_1$, $X_2, \ldots, X_N$.

In this case, the odd-numbered pixels $X_1, X_3, \ldots, X_{N-1}$ may constitute the subset A, and even-numbered pixels $X_2$, $X_4, \ldots, X_N$ may constitute the subset B.

When embedded bit information is to be determined from the reliability distance d in this manner, information can be extracted with statistically sufficient reliability by setting a proper threshold between 0 and reliability distance 2c and determining the presence of embedded information when the absolute value of the reliability distance is larger than the threshold.

Letting $\sigma$ be the standard deviation of the normal distribution 601, if no additional information is embedded, the reliability distance d appears in the interval between −1.96$\sigma$ to +1.96$\sigma$ (95% reliability interval) indicated by the hatched portion in FIG. 6 with a 95% probability.

If, therefore, the threshold is increased, the probability that the reliability distance d appears outside the threshold decreases. This makes it possible to extract information with high reliability.

The embedding depth "c" is added/subtracted to/from each pixel value. If, therefore, the embedding depth "c" is subtracted from a pixel value less than "c", the pixel value takes a negative value. Assume that the maximum value of a pixel is 255 when it is expressed by eight bits. In this case, if "c" is added to a pixel value larger than 255−c, the resultant value becomes larger than the maximum value. Therefore, pixels in which information can be actually embedded are pixels whose pixel values P satisfy c<P<255−c. As a consequence, the number of pixels in which information can be embedded decreases or may decrease. However, since the number of image sensing elements of the CCD of a currently available digital camera is very large, pixels in which information can be embedded with sufficient precision can be ensured.

If the embedding depth "c" is increased, the normal distributions 602 and 603 are separated from the distribution 601 to allow an increase in threshold. If, however, the embedding depth "c" is set to a small value, although a deterioration in image quality is small, the precision of determination on the presence/absence of embedded information decreases. In contrast to this, if the embedding depth "c" is set to a large value, although the precision of determination on the presence/absence of embedded information increases, the image quality deteriorates.

In this embodiment, when "image-quality-priority watermarking" is selected as an invisible watermark embedding mode in FIG. 14, an embedding depth "c1" is used; when "robustness-priority watermarking" is selected, an embedding depth "c2" is used. Obviously, in this case, the relationship between c1 and c2 satisfies c1<c2.

The above description is about an example of image-quality-priority watermarking/robustness-priority watermarking. Obviously, this embodiment may use another method. This is because the essential characteristic feature of the embodiment is that whether watermarking is performed is determined in accordance with the selection of an image sensing mode, and/or whether visible watermarking or invisible watermarking is performed is determined in accordance with the selection if watermarking is performed, and/or whether robustness-priority watermarking or image-quality-priority watermarking is performed is determined in accordance with the selection.

A procedure for processing performed by the camera according to this embodiment will be described in more detail with reference to the flow chart of FIG. 21.

In step S401, it is checked whether the release button 216 is pressed. If NO in step S401, the flow advances to step S402 to perform processing corresponding to operation other than the pressing of the release button 216. The processing to be performed in step S402 includes selection of an image sensing mode.

Figure 19:
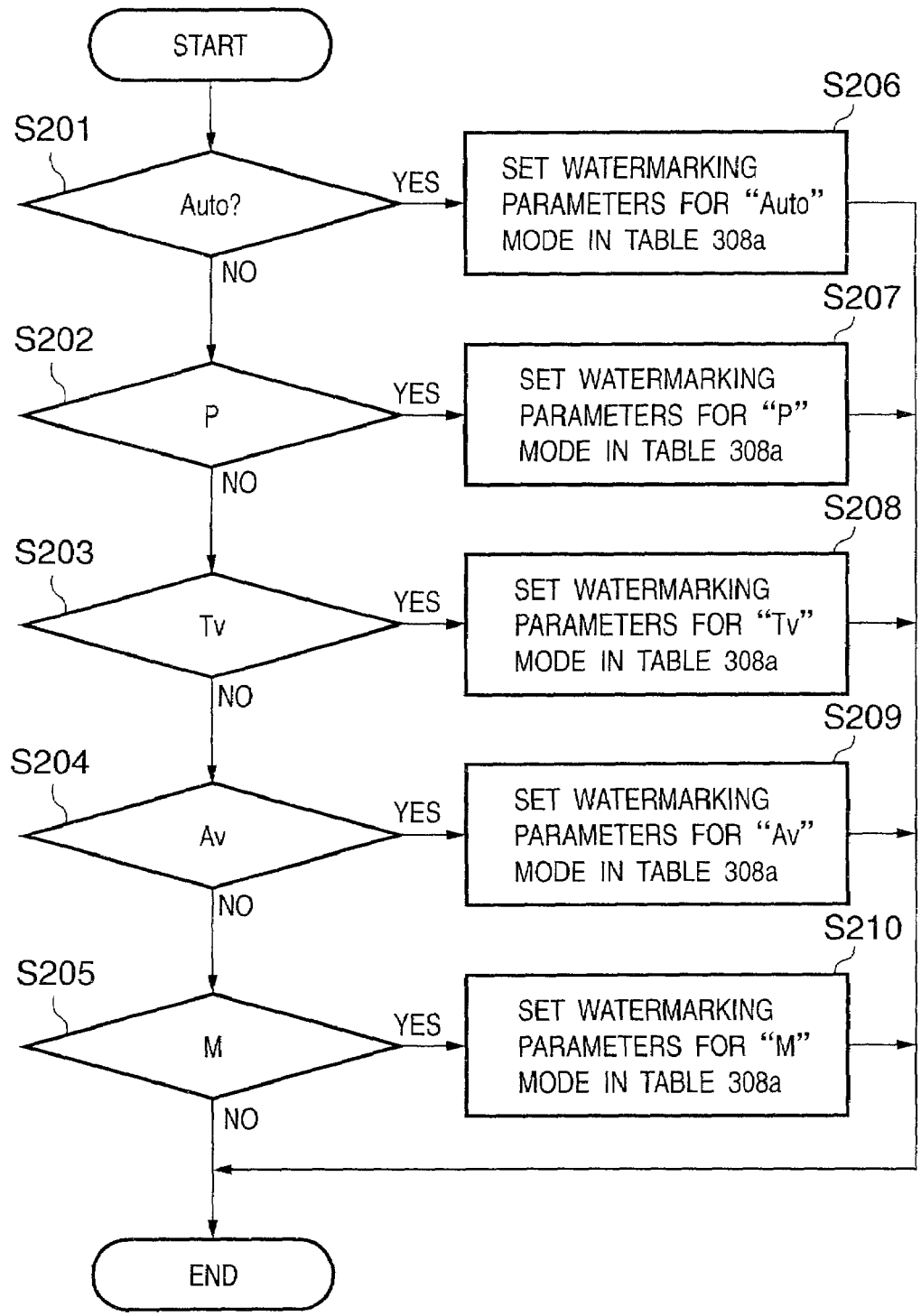
FIG. 19 is a flow chart showing a procedure for processing to be performed when an image sensing mode is changed.

In this case, for example, the selection of an image sensing mode may be performed in accordance with the procedure shown in FIG. 19.

Steps S201 to 205 are decision processing to be performed when an image sensing mode is selected with the dial 212. If "Auto" mode is selected, data indicating whether embedding is performed, data indicating whether visible or invisible watermarking is performed, data indicating whether image-quality-priority watermarking or robustness-priority watermarking is performed, if invisible watermarking is to be performed, and data indicating the type of target to be embedded, which are parameters associated with watermarking in "Auto" mode in the table 304a (see FIG. 14) in the ROM 304, are written in the watermark table 308a in the DRAM 308. In this case, as shown in FIG. 14, flags indicating inhibition of changes are set with respect to the items to which "○" or "-" is attached.

Operation similar to that described above is performed when "P" mode is selected. However, as shown in FIG. 14, since data indicating whether embedding is to be performed can be changed, as the data in the table 308a, the data selected in the immediately preceding image sensing mode is left. Note, however, all the items are set as changeable items.

The above processing is a procedure associated with the operation of the dial 212. If, for example, the user operates various switches, after selection of "P" mode, to determine whether to perform embedding, whether to perform visible or invisible watermarking if embedding is determined, and whether to perform image-quality-priority watermarking or robustness-priority watermarking if invisible watermarking is determined, the contents are reflected in the table 308a.

In the above manner, the user makes settings for image sensing modes and watermarking. As shown in FIG. 19, if "Auto" mode is selected in step S201, then in step S206 watermarking parameters are set for "Auto" mode in table 308a. If "P" mode is selected in step S202, then in step S207 watermarking parameters are set for "P" mode in table 308a. If "Tv" mode is selected in step S203, then in step S208 watermarking parameters are set for "Tv" mode in table 308a. If "Av" mode is selected in step S204, then in step S209 watermarking parameters are set for "Av" mode in table 3081. If "M" mode is selected in step S205, then in step S210 watermarking parameters are set for "M" mode in table 308a.

Referring back to FIG. 21, information about watermarking is stored in the table 308a or updated in the above manner, and image sensing processing is performed in step S403 when the release button 216 is pressed. The image data obtained by image sensing is stored in the DRAM 308, as described above.

When image data is completely stored in the DRAM 308, the flow advances to step S404 to check whether to perform watermarking. This decision processing is performed by checking whether "Watermarking" in the table 308a is ON. If information is not embedded by watermarking, the flow advances to step S408 to compress/encode the data in the mode set by the user. The resultant data is stored in the memory card 313 in step S409, and this processing is terminated.

If it is determined that the setting indicates the execution of watermarking, the flow advances to step S404 to check by looking up the table 308a whether to perform visible watermarking or invisible watermarking. If it is determined that visible watermarking is performed, target items (to be embedded) are merged, and the resultant data is embedded in part of a corner of the image stored in the DRAM 308 by visible watermarking. Visible watermarking may be performed by the technique disclosed in U.S. Pat. No. 5,530,759, and a description thereof will be omitted. When this embedding operation is complete, the resultant data is stored in the memory card 313 through steps S408 and S409.

If it is determined in step S405 that invisible watermarking is to be performed, the information is embedded by invisible watermarking in step S407.

The processing in step S407 may be performed in accordance with the flow chart of FIG. 20.

In step S301, the watermark table 308a is looked up to determine which items are selected as target items to be embedded at this time, and the target items are merged to generate to-be-embedded information. If image sensing time information is set as a target to be embedded, the current time is read from a timer 314.

It is checked in step S302 whether the information is to be embedded by image-quality-priority watermarking or robustness-priority watermarking. This decision processing is performed by checking "embedding level" in FIG. 18.

If it is determined that the information is to be embedded by image-quality-priority watermarking, the flow advances to step S303 to substitute the value c1 for the embedding depth c. If it is determined that the information is to be embedded by robustness-priority watermarking, the value c2 is substituted for the embedding depth c in step S304. In this case, c1 and c2 satisfy c1<c2, as described above.

When the embedding depth c is determined in this manner, the flow advances to step S305 to embed one bit of the to-be-embedded information in the image. The processing in step S305 is repeated until it is determined in step S306 that all the bits are embedded.

When all the bits are embedded, this processing is terminated. The flow then advances to steps S408 and S409 in FIG. 21 to compress/encode the image data. The resultant data is then stored in the memory card 313.

As described above, according to this embodiment, when the user of the camera changes the image sensing mode of the camera in accordance with an image sensing purpose and object, the watermark mode and to-be-embedded data are automatically changed accordingly. This makes it possible to set an optimal watermark mode in accordance with the image sensing purpose and object without making various setting again, thus greatly improving operability.

[Second Embodiment]

In the first embodiment, when the image sensing mode of the camera is changed, the corresponding watermark mode is changed accordingly. In contrast to this, as shown in FIG. 15, a camera may be configured such that when the watermark mode is changed, the corresponding image sensing mode is automatically changed accordingly.

More specifically, when the "image quality (strength) mode" of watermarking is set to "image quality priority", even if the "image quality (compression) mode" of the image sensing mode of the camera is set to "Std (standard)" or "Eco (low image quality)", the mode is changed to "Fine (high image quality)" in accordance with the watermark mode.

In this case, "sensitivity" is also changed to "low sensitivity" in accordance with the watermark mode to increase the S/N ratio of the image.

If "to-be-embedded data" is set to "user", "date", and "camera ID", it takes much time for embedding processing during releasing operation. Even if, therefore, the "drive mode" of the camera is set to "Cnt (continuous)", this mode is changed to "Sng (single)" because it is difficult to maintain a proper frame speed.

As described above, according to this embodiment, when the user of the camera changes the watermark mode, the image sensing mode of the camera is changed accordingly. This makes it possible to set an optimal image sensing mode without making various settings again, thus greatly improving operability.

In the above embodiment, the timing of embedding of information by watermarking is set in accordance with image data before DCT. However, this timing may be set in accordance with each frequency component after DCT. As is obvious, when several levels of robustness of watermarking are to be set, in particular, a method other than the Patchwork method may be used. It is essential that the camera has the function of properly determining, in accordance with image sensing modes and the like or storage mode, whether to perform watermarking, which kind of watermarking is to be used, if it is determined that watermarking is performed, and/or whether to perform robustness-priority watermarking or image-quality-priority watermarking.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the above storage medium, program codes corresponding to the flow charts described above are stored in the storage medium.

As has been described above, according to the present invention, when the user of the camera changes the image sensing mode of the camera in accordance with an image sensing purpose and object, the embedding mode of the watermarking function and to-be-embedded data are changed accordingly. Alternatively, the image sensing mode of the camera is changed in accordance with the change of the watermark mode. This makes it possible to automatically set an optimal image sensing mode or watermark mode in accordance with the image sensing purpose and object, thus greatly improving operability.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having image sensing means, comprising:
    selection means for manually selecting one of a plurality of image sensing modes for setting quality of an image to be sensed by the image sensing means;
    embedding means for embedding information as a watermark in an image;
    determination means for automatically determining, in accordance with whether or not the image quality corresponding to the manually selected image sensing mode is lower than a predetermined quality, whether to activate said embedding means; and
    control means for, when said determination means determines that the information is to be embedded, performing control to activate said embedding means to embed the information in currently sensed image data obtained by the image sensing means if said determination means determines that the information is to be embedded, and for performing, when said determination means determines that the information is not to be embedded, control to inactivate said embedding means, wherein
    said embedding means comprises first embedding means for embedding information as a visible watermark in an image, second embedding means for embedding information as an invisible watermark in an image with priority given to image quality of the image in which the information is to be embedded, and third embedding means for embedding information as an invisible watermark in an image with priority given to robustness of the information to be embedded, and said determination means comprises means for determining one of said first to third embedding means to perform its embedding function when embedding is to be performed.

2. An image sensing method for use with an apparatus having image sensing means, said method comprising:

a selection step of manually selecting one of a plurality of image sensing modes for setting quality of an image to be sensed by the image sensing means;

a determination step of automatically determining, in accordance with whether or not the image quality corresponding to the manually selected image sensing mode is lower than a predetermined quality, whether to activate embedding means for embedding information as a watermark in an image; and a control step of, when said determination step determines that embedding is to be executed, performing control to activate the embedding means to embed the watermark in currently sensed image data obtained by the image sensing means, and, when said determination step determines that embedding is not to be executed, performing control to inactivate the embedding means, wherein the embedding means comprises first embedding means for embedding information as a visible watermark in an image, second embedding means for embedding information as an invisible watermark in an image with priority given to image quality of the image in which the information is to be embedded, and third embedding means for embedding information as an invisible watermark in an image with priority given to robustness of the information to be embedded, and wherein said determination step comprises determining one of said first to third embedding means to perform the embedding function when embedding is to be performed.

* * * * *

UNITED STATES PATENT AND TRADEMARK OFFICE
CERTIFICATE OF CORRECTION

PATENT NO. : 7,197,157 B2
APPLICATION NO. : 09/839137
DATED : March 27, 2007
INVENTOR(S) : Akira Akashi It is certified that error appears in the above-identified patent and that said Letters Patent is hereby corrected as shown below:

Front Cover:
    Foreign Application Priority Data (30)
        "2001-0933U" should read --2001-093331--.

Figure 14: "Quality(Strength)" should read --Quality (Strength)--.

Col. 1, line 24, "are expected" should read --is expected--.

line 26, "tampered" should read --tampered with.--

Col. 2, line 35, "An watermark image" should read --A watermark image--.

Col. 3, line 50, "Figs. 10A to 10C" should read --Figs. 10A, 10B and 10C--.

line 64, "Figs. 11A to 11C" should read --Figs. 11A, 11B and 11C--.

Col. 4, line 48, "screen 203" should read --203--.

Col. 8, line 55, "image sensing date," should read --image sensing data,--

Col. 9, lines 42-47,
$$\begin{aligned}\text{"d} &= 1/N \cdot \Sigma\, (a_i - b_i) \\ &= 1/N \cdot \Sigma\, \{(a_i + c) - (b_i - c)\} \\ &= 1/N \cdot \Sigma\, \{(a_i + b_i) + 2c\} \\ &= 2c\text{"}\end{aligned}$$
should read
$$\begin{aligned}\text{--d} &= 1/N \cdot \Sigma\, (a_i - b_i) \\ &= 1/N \cdot \Sigma\, \{(a_i + c) - (b_i - c)\} \\ &= 1/N \cdot \Sigma\, \{(a_i + b_i) + 2c\} \\ &\fallingdotseq 2c\text{--}.\end{aligned}$$

Col. 11, line 55, "operation" should read --An operation--.

UNITED STATES PATENT AND TRADEMARK OFFICE
CERTIFICATE OF CORRECTION

PATENT NO. : 7,197,157 B2
APPLICATION NO. : 09/839137
DATED : March 27, 2007
INVENTOR(S) : Akira Akashi It is certified that error appears in the above-identified patent and that said Letters Patent is hereby corrected as shown below:

Col. 13, line 15, "setting" should read --settings--.

Signed and Sealed this

Eleventh Day of December, 2007

JON W. DUDAS
*Director of the United States Patent and Trademark Office*